(12) United States Patent
Bennett et al.

(10) Patent No.: US 6,523,846 B1
(45) Date of Patent: Feb. 25, 2003

(54) TRAILER PLATFORM

(76) Inventors: Jerry D. Bennett, 590 Bennett Dr., Midland, MI (US) 48640; Thomas E. Bennett, deceased, late of Sun City West, AZ (US); by Betty J. Bennett, legal representative, 13435 Castle Rock Dr., Sun City West, AZ (US) 85375

( * ) Notice: Subject to any disclaimer, the term of this patent is extended or adjusted under 35 U.S.C. 154(b) by 0 days.

(21) Appl. No.: 09/965,722

(22) Filed: Sep. 27, 2001

(51) Int. Cl.[7] .............................. B60R 3/02; E06C 5/04
(52) U.S. Cl. ..................... 280/163; 114/344; 182/92; 108/44
(58) Field of Search ............................ 280/163, 164.1, 280/169, 414.1; 182/92; 108/44, 43; 114/344

(56) References Cited

U.S. PATENT DOCUMENTS

| | | |
|---|---|---|
| 3,357,719 A | 12/1967 | Mccrea |
| 4,056,270 A | 11/1977 | Greenfield |
| 4,911,264 A | 3/1990 | Mccafferty |
| 4,943,076 A | 7/1990 | Tripke |
| 5,427,289 A * | 6/1995 | Ostor ........................ 224/42.43 |
| 5,515,806 A * | 5/1996 | McCabe ........................ 114/362 |
| D371,336 S | 7/1996 | Wilson |
| 5,799,961 A * | 9/1998 | Schmeets ..................... 280/163 |
| 5,799,962 A | 9/1998 | Barnhart |
| 5,853,278 A * | 12/1998 | Frantz ........................ 414/462 |
| 6,237,927 B1 * | 5/2001 | Debo ........................... 280/163 |

* cited by examiner

*Primary Examiner*—Brian L. Johnson
*Assistant Examiner*—Jeff Restifo

(57) ABSTRACT

A trailer platform for positioning on a trailer for standing on while loading and unloading a boat. The trailer platform includes a pair of elongate members having a first end, a second end, and an inner surface. A first coupling member is coupled to a first end of a first of the elongate members and removably secured to a yolk of a trailer. A second coupling member is coupled to a first end of a second of the elongate members and removably secured to the yolk. A third coupling member is coupled to the second end of the first elongate member and the second end of the second elongate member. The third coupling member is removably coupled to a hitch bar. Each one of a pair of mesh portions is securely attached to and extends away from one of the inner surfaces of the elongate members.

6 Claims, 3 Drawing Sheets

TRAILER PLATFORM

BACKGROUND OF THE INVENTION

1. Field of the Invention

The present invention relates to platforms for trailers and more particularly pertains to a new trailer platform for positioning on a trailer so that a person need not wade through water while loading and unloading a boat.

2. Description of the Prior Art

The use of platforms for trailers is known in the prior art. More specifically, platforms for trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,799,962; 4,056,270; 4,943,076; U.S. Des. Pat. No. 371,336; U.S. Pat. Nos. 3,357,719; and 4,911,264.

While these devices fulfill their respective, particular objectives and requirements, the aforementioned patents do not disclose a new trailer platform. The inventive device includes a pair of elongate members. Each of the elongate members has a first end and a second end. Each of the elongate members has at least one bend therein. Each of the elongate members has an inner surface an outer surface. A first coupling member is hingedly coupled to a first end of a first of the elongate members. The first coupling member is removably secured to a yolk of a trailer. A second coupling member is hingedly coupled to a first end of a second of the elongate members. The second coupling member is removably secured to the yolk. A third coupling member is coupled to the second end of the first elongate member and the second end of the second elongate member. The third coupling member is removably coupled to the hitch bar. A first of a pair of mesh portions is securely attached to and extends away from the inner surface of the first elongate member. A second of the mesh portions is securely attached to and extending away from the inner surface of the second elongate member.

In these respects, the trailer platform according to the present invention substantially departs from the conventional concepts and designs of the prior art, and in so doing provides an apparatus primarily developed for the purpose of positioning on a trailer so that a person need not wade through water while loading and unloading a boat.

SUMMARY OF THE INVENTION

In view of the foregoing disadvantages inherent in the known types of platforms for trailers now present in the prior art, the present invention provides a new trailer platform construction wherein the same can be utilized for positioning on a trailer so that a person need not wade through water while loading and unloading a boat.

The general purpose of the present invention, which will be described subsequently in greater detail, is to provide a new trailer platform apparatus and method which has many of the advantages of the platforms for trailers mentioned heretofore and many novel features that result in a new trailer platform which is not anticipated, rendered obvious, suggested, or even implied by any of the prior art platforms for trailers, either alone or in any combination thereof.

To attain this, the present invention generally comprises a pair of elongate members. Each of the elongate members has a first end and a second end. Each of the elongate members has at least one bend therein. Each of the elongate members has an inner surface an outer surface. A first coupling member is hingedly coupled to a first end of a first of the elongate members. The first coupling member is removably secured to a yolk of a trailer. A second coupling member is hingedly coupled to a first end of a second of the elongate members. The second coupling member is removably secured to the yolk. A third coupling member is coupled to the second end of the first elongate member and the second end of the second elongate member. The third coupling member is removably coupled to the hitch bar. A first of a pair of mesh portions is securely attached to and extends away from the inner surface of the first elongate member. A second of the mesh portions is securely attached to and extending away from the inner surface of the second elongate member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer platform apparatus and method which has many of the advantages of the platforms for trailers mentioned heretofore and many novel features that result in a new trailer platform which is not anticipated, rendered obvious, suggested, or even implied by any of the prior art platforms for trailers, either alone or in any combination thereof.

It is another object of the present invention to provide a new trailer platform which may be easily and efficiently manufactured and marketed.

It is a further object of the present invention to provide a new trailer platform which is of a durable and reliable construction.

An even further object of the present invention is to provide a new trailer platform which is susceptible of a low cost of manufacture with regard to both materials and labor, and which accordingly is then susceptible of low prices of sale to the consuming public, thereby making such trailer platform economically available to the buying public.

Still yet another object of the present invention is to provide a new trailer platform which provides in the apparatuses and methods of the prior art some of the advantages thereof, while simultaneously overcoming some of the disadvantages normally associated therewith.

Still another object of the present invention is to provide a new trailer platform for positioning on a trailer so that a person need not wade through water while loading and unloading a boat.

Yet another object of the present invention is to provide a new trailer platform which includes a pair of elongate members. Each of the elongate members has a first end and a second end. Each of the elongate members has at least one bend therein. Each of the elongate members has an inner surface an outer surface. A first coupling member is hingedly coupled to a first end of a first of the elongate members. The first coupling member is removably secured to a yolk of a trailer. A second coupling member is hingedly coupled to a first end of a second of the elongate members. The second coupling member is removably secured to the yolk. A third coupling member is coupled to the second end of the first elongate member and the second end of the second elongate member. The third coupling member is removably coupled to the hitch bar. A first of a pair of mesh portions is securely attached to and extends away from the inner surface of the first elongate member. A second of the mesh portions is securely attached to and extending away from the inner surface of the second elongate member.

Still yet another object of the present invention is to provide a new trailer platform that allows a user a relatively large area of room for walking with respect to the hitch bar so that the person need not walk in the water.

Even still another object of the present invention is to provide a new trailer platform that has hingedly coupled elongate members so that the device is retrofittable to existing trailers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
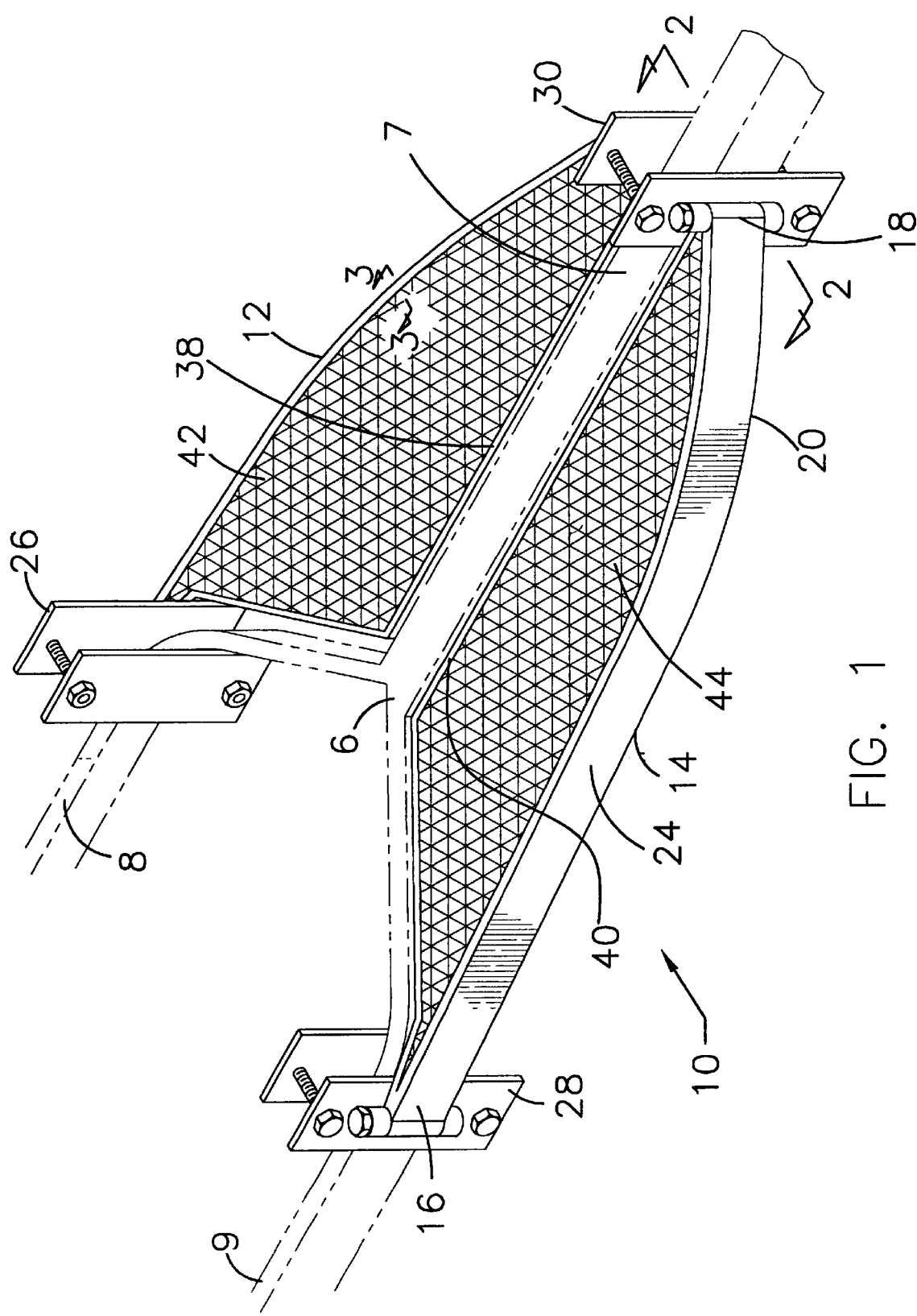
FIG. 1 is a schematic perspective view of a new trailer platform according to the present invention.
Figure 2:
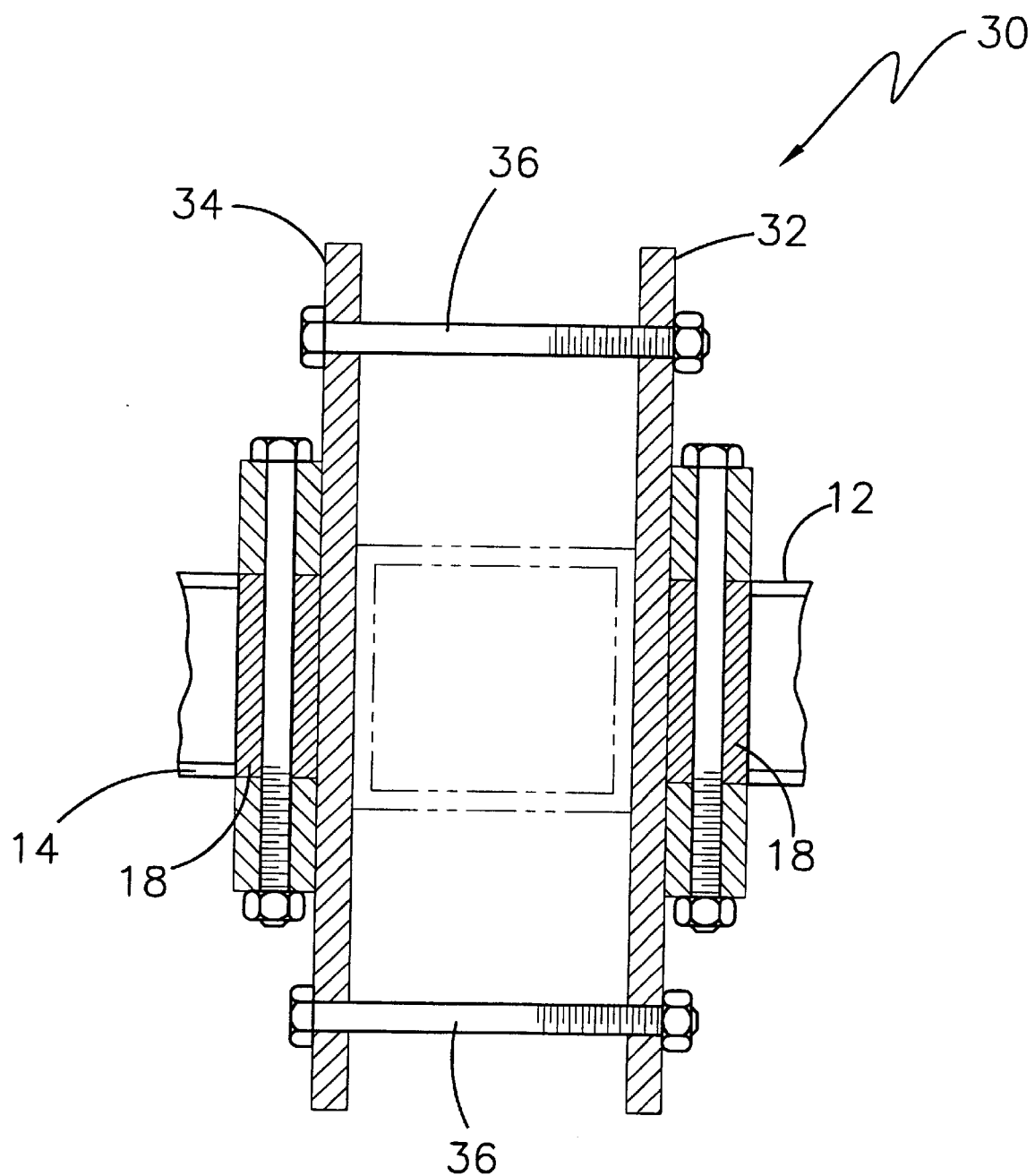
FIG. 2 is a schematic cross-sectional view taken along 2—2 of FIG. 1 of the present invention.
Figure 3:
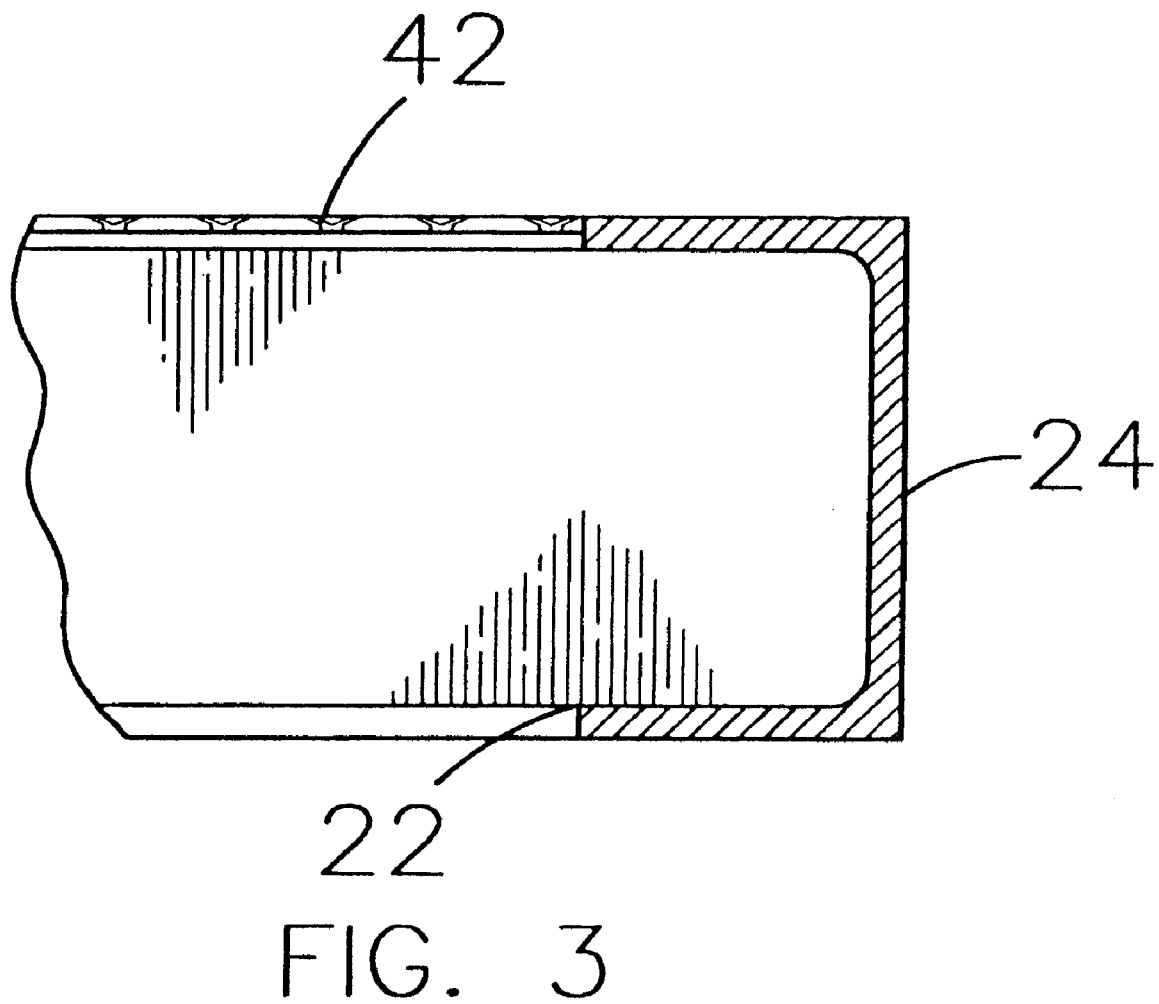
FIG. 3 is a schematic cross-sectional view taken along line 3—3 of FIG. 1 the present invention.

With reference now to the drawings, and in particular to FIGS. 1 through 3 thereof, a new trailer platform embodying the principles and concepts of the present invention and generally designated by the reference numeral 10 will be described.

As best illustrated in FIGS. 1 through 3, the trailer platform 10 generally comprises a pair of elongate members 12, 14 coupled to a trailer 6. The trailer 6 is a conventional trailer having a yolk portion having a hitch bar 7 and two arms 8, 9 extending generally in a Y-shaped configuration. Each of the elongate members 12, 14 has a first end 16 and a second end 18. Each of the elongate members 12, 14 has at least one bend 20 therein. Each of the bends 20 is preferably arcuate. The elongate members 12, 14 each have an inner surface 22 an outer surface 24.

A first coupling member 26 is hingedly coupled to the first end 16 of the first of the elongate members 12. The first coupling member 26 is removably secured to a first of the arms 8 of the yolk.

A second coupling member 28 is hingedly coupled to the first end 16 of a second of the elongate members 14. The second coupling member 28 is removably secured to a second 9 of the arms of the yolk.

A third coupling member 30 comprises a first plate 32 and a second plate 34. The first plate 32 is hingedly coupled to the second end 18 of the first elongate member 12. The second plate 34 is hingedly coupled to the second end 18 of the second elongate member 14. A pair of fastening means 36 removably fastens the first plate 32 to the second plate 34. Each of the fastening means 36 extends between through the first and second plates. Each of the plates 32, 34 is positioned on an opposite side of the hitch bar 7 and fastened together such that a first of the fastening means is above the hitch bar and a second of the fastening means is below the hitch bar. The fastening means are conventional fasteners and are preferably bolts. In this embodiment, the first 26 and second 28 coupling members are substantially identical to the third coupling member 30 where one of the plates is coupled to each of the elongate members.

A first rod 38 has a pair of ends. Each of the ends of the first rod 38 is integrally coupled to one of the first 16 and second 18 ends of the first elongate member 12. A second rod 40 has a pair of ends. Each of the ends of the second rod 40 is integrally coupled to one of the first 16 and second 18 ends of the second elongate member 14. Each of the first 38 and second 40 rods are preferably bent away from the respective elongate members 12, 14 such that a space of less than preferably 1 inch, and ideally ½ inch, is provided between the rods 38, 40 and the hitch bar 7 and arms 8, 9 when the device is coupled to the trailer 6. The device will generally be, made to accommodate various trailers while retaining this small amount of space between the rods and the trailer.

A pair of mesh portions are used for standing on by the user. A first mesh portion 42 is securely attached to and extends between the inner surface 22 of the first elongate member 12 and the first rod 38. A second mesh portion 44 is securely attached to and extends between the inner surface 22 of the second elongate member 14 and the second rod 40. The mesh portions 42, 44 are coupled to the respective rods substantially along a length of the rods. The mesh portions ideally comprise a woven metal mesh for strength.

In use, the device is coupled to the trailer as described above. When a person is loading and unloading a boat from the trailer, they may step upon the mesh portions instead of stepping into the water. This allows them to stay dry and not become bogged down in weeds and mud that may surround the boat launch area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A boat launching platform device, said device being removably coupled to a yolk of a boat trailer, the yolk having a hitch bar and two arms extending away from the hitch bar in a generally Y-shaped configuration, said device comprising:

a pair of elongate members, each of said elongate members having a first end and a second end, each of said elongate members having at least one bend therein, each of said elongate members having an inner surface and an outer surface;

a first coupling member, said first coupling member being coupled to a first end of a first of said elongate members, said first coupling member being removably secured to said yolk;

a second coupling member, said second coupling member hingedly coupled to a first end of a second of said elongate members, said second coupling member being removably secured to said yolk;

a third coupling member, said third coupling member being coupled to said second end of said first elongate member and said second end of said second elongate member, said third coupling member being removably coupled to said hitch bar; and a pair of mesh portions, a first mesh portion being securely attached to and extending away from said inner surface of said first elongate member, a second mesh portion being securely attached to and extending away from said inner surface of said second elongate member.

2. The boat launching platform device as in claim 1, wherein said first and second coupling members comprise:

said first coupling member being hingedly coupled to said first end of said first elongate member, said first coupling member being removably secured to a first of said arms of said yolk; and said second coupling member being hingedly coupled to said second end of said second of said elongate members, said second coupling member being removably secured to a second of said arms of said yolk.

3. The boat launching platform device as in claim 2, wherein said third coupling member comprises a first plate and a second plate, said first plate being hingedly coupled to said second end of said first elongate member, said second plate being hingedly coupled to said second end of said second elongate member, a pair of fastening means for removably fastening said first plate to said second plate, each of said fastening means extending between through said first and second plates, wherein each of said plates is positioned on an opposite side of said hitch bar and fastened together such that a first of said fastening means is above said hitch bar and a second of said fastening means is below said hitch bar.

4. The boat launching platform device as in claim 2, further comprising:

a first rod, said first rod having a pair of ends, each of said ends of said first rod being integrally coupled to one of said first and second ends of said first elongate member;

a second rod, said second rod having a pair of ends, each of said ends of said second rod being integrally coupled to one of said first and second ends of said second elongate member; and said first mesh portion being securely attached to and extending between said inner surface of said first elongate member and said first rod, said second mesh portion being securely attached to and extending between said inner surface of said second elongate member and said second rod, wherein said mesh portions are coupled to the respective rods substantially along a length of said rods.

5. The boat launching platform device as in claim 4, wherein each of the first and second rods are preferably bent away from a respective elongate member such that a space of less than 1 inch is provided between said rods and said hitch bar and said arms of said trailer when said device is coupled to said trailer.

6. A boat launching platform device, said device being removably coupled to a yolk of a boat trailer, the yolk having a hitch bar and two arms extending away from the hitch bar in a generally Y-shaped configuration, said device comprising:

a pair of elongate members, each of said elongate members having a first end and a second end, each of said elongate members having at least one bend therein, each of said bends being generally arcuate, each of said elongate members having an inner surface and an outer surface;

a first coupling member, said first coupling member being hingedly coupled to said first end of a first of said elongate members, said first coupling member being removably secured to a first of said arms of said yolk;

a second coupling member, said second coupling member being hingedly coupled to said first end of a second of said elongate members, said second coupling member being removably secured to a second of said arms of said yolk;

a third coupling member, said third coupling member comprising a first plate and a second plate, said first plate being hingedly coupled to said second end of said first elongate member, said second plate being hingedly coupled to said second end of said second elongate member, a pair of fastening means for removably fastening said first plate to said second plate, each of said fastening means extending between through said first and second plates, wherein each of said plates is positioned on an opposite side of said hitch bar and fastened together such that a first of said fastening means is above said hitch bar and a second of said fastening means is below said hitch bar;

a first rod, said first rod having a pair of ends, each of said ends of said first rod being integrally coupled to one of said first and second ends of said first elongate member;

a second rod, said second rod having a pair of ends, each of said ends of said second rod being integrally coupled to one of said first and second ends of said second elongate member, wherein each of the first and second rods are preferably bent away from a respective elongate member such that a space of less than 1 inch is provided between said rods and said hitch bar and said arms of said trailer when said device is coupled to said trailer; and a pair of mesh portions, a first mesh portion being securely attached to and extending between said inner surface of said first elongate member and said first rod, a second mesh portion being securely attached to and extending between said inner surface of said second elongate member and said second rod, wherein said mesh portions are coupled to the respective rods substantially along a length of said rods.

* * * * *